US009843797B2

(12) United States Patent
Myers

(10) Patent No.: US 9,843,797 B2
(45) Date of Patent: Dec. 12, 2017

(54) IMAGING SYSTEMS HAVING COLUMN READOUT CIRCUITRY WITH TEST DATA INJECTION CAPABILITIES

(71) Applicant: SEMICONDUCTOR COMPONENTS INDUSTRIES, LLC, Phoenix, AZ (US)

(72) Inventor: Charles G. Myers, Hillsboro, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 152 days.

(21) Appl. No.: 14/736,480

(22) Filed: Jun. 11, 2015

(65) Prior Publication Data

US 2016/0366402 A1 Dec. 15, 2016

(51) Int. Cl.
| | |
|---|---|
| H04N 17/00 | (2006.01) |
| H04N 17/02 | (2006.01) |
| H04N 5/228 | (2006.01) |
| H04N 5/378 | (2011.01) |
| H04N 5/367 | (2011.01) |

(52) U.S. Cl.
CPC ......... *H04N 17/004* (2013.01); *H04N 5/367* (2013.01); *H04N 5/378* (2013.01); *H04N 17/002* (2013.01)

(58) Field of Classification Search
CPC .. G03B 43/00; H04N 17/002; H04N 1/00013; H04N 1/00018; H04N 5/2178; H04N 5/3653; H04N 5/2176; H04N 5/367; H04N 5/3675; H04N 1/4097; G01R 31/2851; G06T 7/0018; G02F 1/1309; G09G 2330/10; G09G 2330/12; G09G 3/006

USPC ............. 348/241–249, 175–189, 222.1
See application file for complete search history.

(56) References Cited

U.S. PATENT DOCUMENTS

| | | | |
|---|---|---|---|
| 5,818,572 A | 10/1998 | Pappas | |
| 5,859,920 A | 1/1999 | Daly | |
| 6,747,695 B1 * | 6/2004 | Afghahi | H04N 5/361 348/241 |
| 7,400,389 B2 | 7/2008 | Gomm | |
| 8,350,934 B2 | 1/2013 | Chao | |

(Continued)

OTHER PUBLICATIONS

Beck et al., U.S. Appl. No. 14/231,694, filed Mar. 31, 2014.
Lim et al., U.S. Appl. No. 14/675,877, filed Apr. 1, 2015.

*Primary Examiner* — Chia-Wei A Chen
(74) *Attorney, Agent, or Firm* — Treyz Law Group, P.C.; Michael H. Lyons; David K. Cole

(57) ABSTRACT

An imaging system may include an array of image pixels and column readout circuits coupled to each column. The column readout circuits may include test data injection circuitry and converter circuitry coupled to column memory via switching circuits. The injection circuitry may enable the switching circuits so that pixel data is stored on the column memory as rows of an image frame. The injection circuitry may disable the switching circuits and may inject test bits onto the column memory while the switching circuits are disabled. The column memory may store the test bits as one or more rows of the image frame interspersed among rows of the pixel data. Verification circuitry coupled to the column readout circuits may process the test data bits in the image frame to verify proper functionality of some or all of the imaging system without disrupting normal imaging operations by the imaging system.

19 Claims, 7 Drawing Sheets

(56) References Cited

U.S. PATENT DOCUMENTS

| | | | |
|---|---|---|---|
| 8,730,330 B2 | 5/2014 | Solhusvik | |
| 8,843,343 B2 | 9/2014 | Pahr | |
| 8,854,475 B2 | 10/2014 | Johansson | |
| 8,952,311 B2 | 2/2015 | Johnson | |
| 9,264,703 B2* | 2/2016 | Pahr | G01R 31/2829 |
| 2002/0080677 A1* | 6/2002 | Watanabe | G11C 8/12 |
| | | | 365/189.011 |
| 2003/0034941 A1* | 2/2003 | Janssen | G09G 3/006 |
| | | | 345/87 |
| 2006/0013485 A1* | 1/2006 | Nitta | G06K 9/60 |
| | | | 382/194 |
| 2008/0048946 A1* | 2/2008 | Kwak | G09G 3/006 |
| | | | 345/76 |
| 2009/0141155 A1* | 6/2009 | Ellis-Monaghan | H04N 5/35527 |
| | | | 348/308 |
| 2009/0174801 A1* | 7/2009 | Dungan | H04N 5/367 |
| | | | 348/308 |
| 2009/0244334 A1* | 10/2009 | Otaka | H04N 5/3575 |
| | | | 348/294 |
| 2009/0278963 A1* | 11/2009 | Shah | H04N 5/3658 |
| | | | 348/241 |
| 2011/0063921 A1* | 3/2011 | Schatzberger | G11C 16/0483 |
| | | | 365/185.23 |
| 2012/0133794 A1* | 5/2012 | Silsby | H04N 5/367 |
| | | | 348/231.99 |
| 2013/0020467 A1* | 1/2013 | Johnson | H04N 5/3658 |
| | | | 250/208.1 |
| 2013/0083204 A1* | 4/2013 | Solhusvik | H04N 5/378 |
| | | | 348/187 |
| 2013/0271626 A1* | 10/2013 | Chou | G01J 1/46 |
| | | | 348/241 |
| 2014/0226027 A1* | 8/2014 | Johansson | H04N 17/002 |
| | | | 348/187 |
| 2015/0341582 A1* | 11/2015 | Sakaguchi | H01L 27/14634 |
| | | | 348/301 |
| 2016/0028980 A1* | 1/2016 | Kameyama | H04N 5/378 |
| | | | 348/294 |

* cited by examiner

IMAGING SYSTEMS HAVING COLUMN READOUT CIRCUITRY WITH TEST DATA INJECTION CAPABILITIES

BACKGROUND

This relates generally to imaging systems and, more particularly, to imaging systems that use verification circuitry to test the integrity of the imaging system.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

In automotive image sensors, it may be beneficial to the overall system integrity to be in compliance with well known automotive safety standards such as the ISO 26262 road vehicle functional safety standard. In order to comply with such types of safety standards, it may be desirable for automotive image sensors to perform self-checking procedures to determine whether the image sensor is operating properly. In particular, it may be desirable to determine whether an image pixel array within the image sensor satisfies performance criteria. In conventional automotive image sensors, it is impossible to impose a known photonic scene on the pixel array while the image sensor is embedded within the automobile. This presents a challenge for the system to test the safety of automotive image sensors.

It would therefore be desirable to provide improved imaging systems with capabilities to verify the functionality of the imaging system embedded within an automobile.

DETAILED DESCRIPTION

Figure 1:
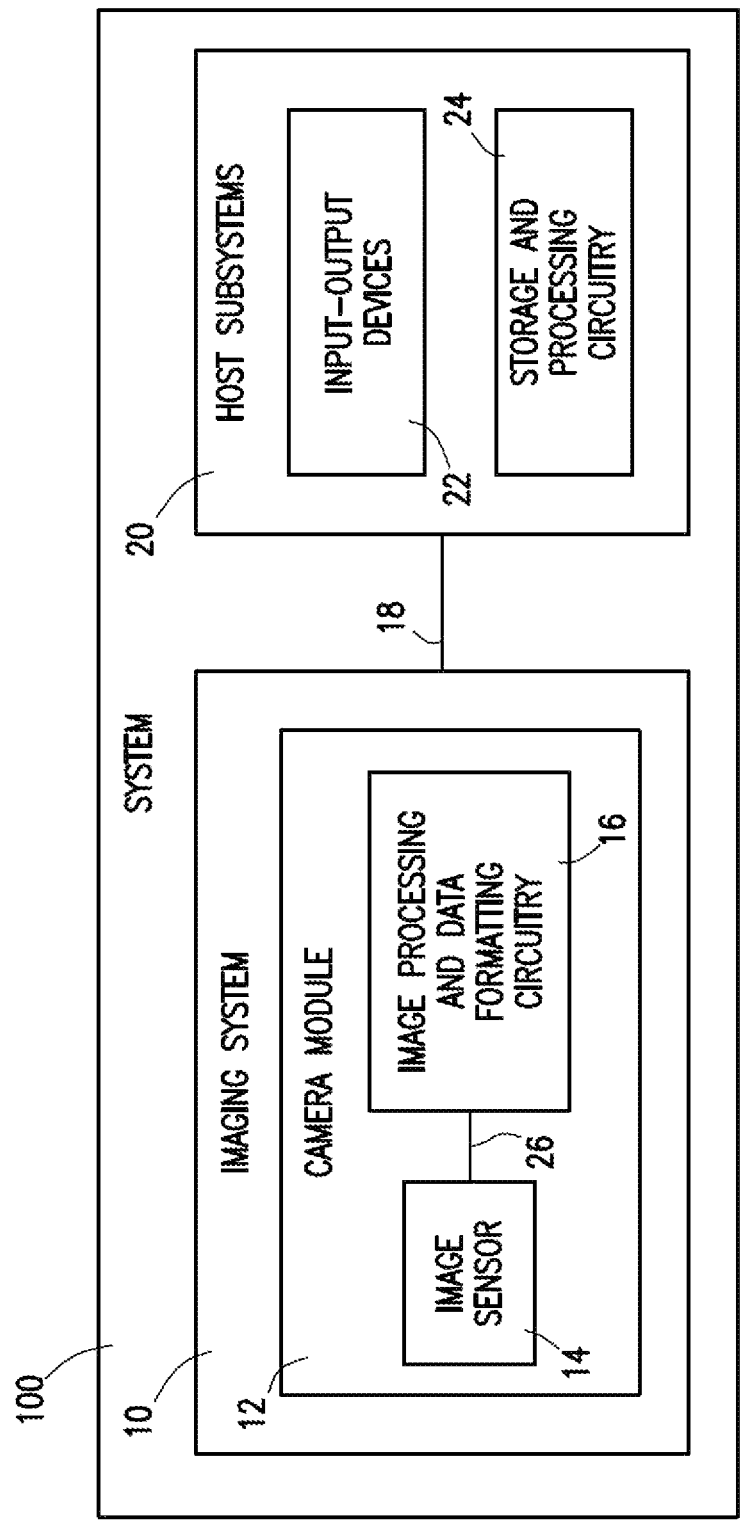
FIG. 1 is a diagram of an illustrative system that includes an imaging system and a host subsystem in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

In some configurations, verification image data may be compared with a predetermined standard stored in the imaging system, generated by the imaging system during operation, or stored on additional circuitry that is external to the imaging system. The predetermined standard may be an expected value, may be a mathematically determined threshold, may sometimes be referred to as a "golden" standard image, may be captured during manufacturing of the imaging system or at another suitable time (e.g., during startup or shutdown of the imaging system), and/or may include one or more mathematically or experimentally determined ranges to which verification image data may be compared.

Based on the result of the comparison of the verification image data with the predetermined standard or predetermined pattern, an imaging system may be disabled (e.g., if the result is outside the predetermined range or if the result does not match a reference signal) or may continue to operate normally (e.g., if the result is within the predetermined range or if the result matches a reference signal). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry (sometimes referred to herein as test circuitry or testing circuitry) associated with image sensor 14 may be occasionally operated (e.g., following each image frame capture, following every other image frame capture, following every fifth image frame capture, during a portion of an image frame capture, etc.). Images captured when verification circuitry is operated may include test data (sometimes referred to herein as verification data) containing verification information. Verification data may be provided to image processing circuitry 16 and/or storage and processing circuitry 24. Image processing circuitry 16 may be configured to compare the verification data to a predetermined data set stored on image processing circuitry 16. Following the comparison, image processing circuitry 16 may send status information or other verification information to host subsystem 20. This example is merely illustrative. In general, the verification circuitry may perform any desired test processing operations on the verification data to verify proper functionality and performance of one or more components of camera module 12.

Figure 2:
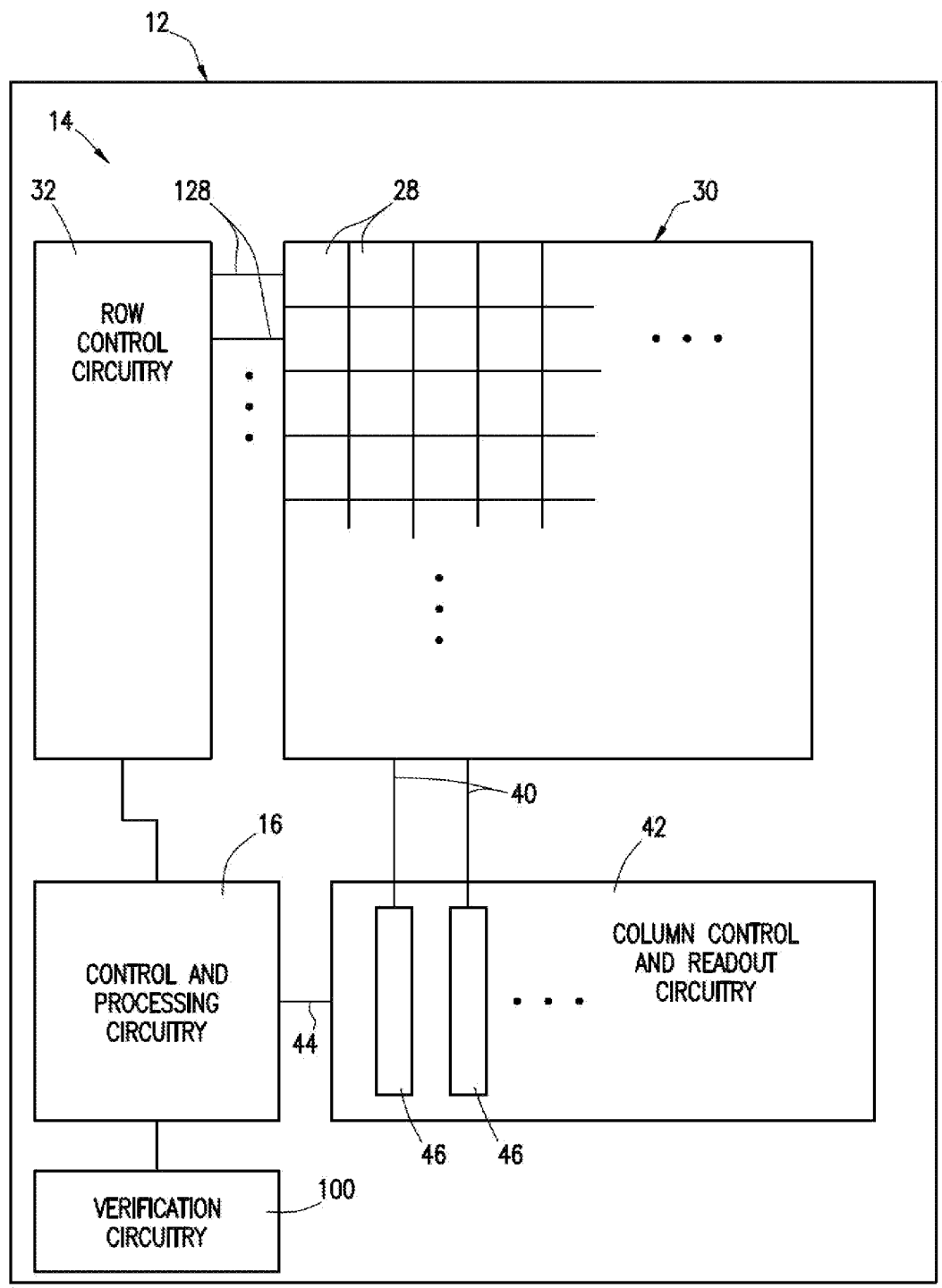
FIG. 2 is a diagram of an illustrative image sensor having an array of image pixels, verification circuitry, and control circuitry coupled to the array of image pixels in accordance with an embodiment of the present invention.

An example of an arrangement for camera module 12 is shown in FIG. 2. As shown in FIG. 2, camera module 12 includes image sensor 14 and control and processing circuitry 16. Image sensor 14 may include a pixel array such as array 30 of pixels 28 (sometimes referred to herein as image sensor pixels or image pixels 28). Control circuitry 16 may be coupled to row control circuitry 32 and may be coupled to column control and readout circuitry 42 via global data path 44. Row control circuitry 32 may receive row addresses from control circuitry 16 and may supply corresponding row control signals to image pixels 28 over control paths 128 (e.g., dual conversion gain control signals, pixel reset control signals, charge transfer control signals, blooming control signals, row select control signals, or any other desired pixel control signals). Column control and readout circuitry 42 may be coupled to the columns of pixel array 30 via one or more conductive lines such as column lines 40. Column lines 40 may be coupled to each column of image pixels 28 in image pixel array 30 (e.g., each column of pixels may be coupled to a corresponding column line 40). Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out by circuitry 42 on column lines 40.

Column control and readout circuitry 42 may include a number of column readout circuits 46. Each column readout circuit 46 may be coupled to a corresponding column line 40 and may read out and receive image signals from pixels 28 coupled to the corresponding column line. Each column readout circuit 46 may include column circuitry such as a column amplifier for amplifying signals read out from array 20, sample and hold circuitry for sampling and storing signals read out from array 20, analog-to-digital converter (ADC) circuit for converting read out analog signals to corresponding digital signals, and column memory for storing the read out signals and any other desired data. Column readout circuits 46 may output digital pixel values to control and processing circuitry 16 over line 44.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

If desired, column readout circuits 46 may include test and verification circuitry for performing test operations on image sensor 14. For example, column readout circuits 46 may be used to inject test data (e.g., a predetermined pattern of test bits) into the pixel data read out from array 20. Camera module 12 may include verification (test) circuitry such as verification circuitry 100. Verification circuitry 100 may process the test signals to determine whether image sensor 14 is operating properly. For example, verification circuitry 100 may compare the output test signals with reference data to determine whether or not image sensor 14 is functioning properly.

In some scenarios, testing on image sensor 14 may be performed by temporarily disabling a normal imaging mode of operation of image sensor 14 (e.g., by transitioning sensor 14 from an imaging mode to a test or calibration mode). Once image sensor 14 has been placed in the test mode, test data is injected into the array and read out from the array for validating the performance of image sensor 14. However, taking image sensor 14 out of a normal mode of operation (e.g., offline) to perform testing can be disruptive to a user of image sensor 14 and may interfere with normal imaging operations. The consequences of such disruptions may be greatly amplified in scenarios where camera module 12 is formed as part of an automotive imaging system, for example. It may therefore be desirable to be able to provide image sensor 14 with improved systems and methods for performing test operations.

Figure 3:
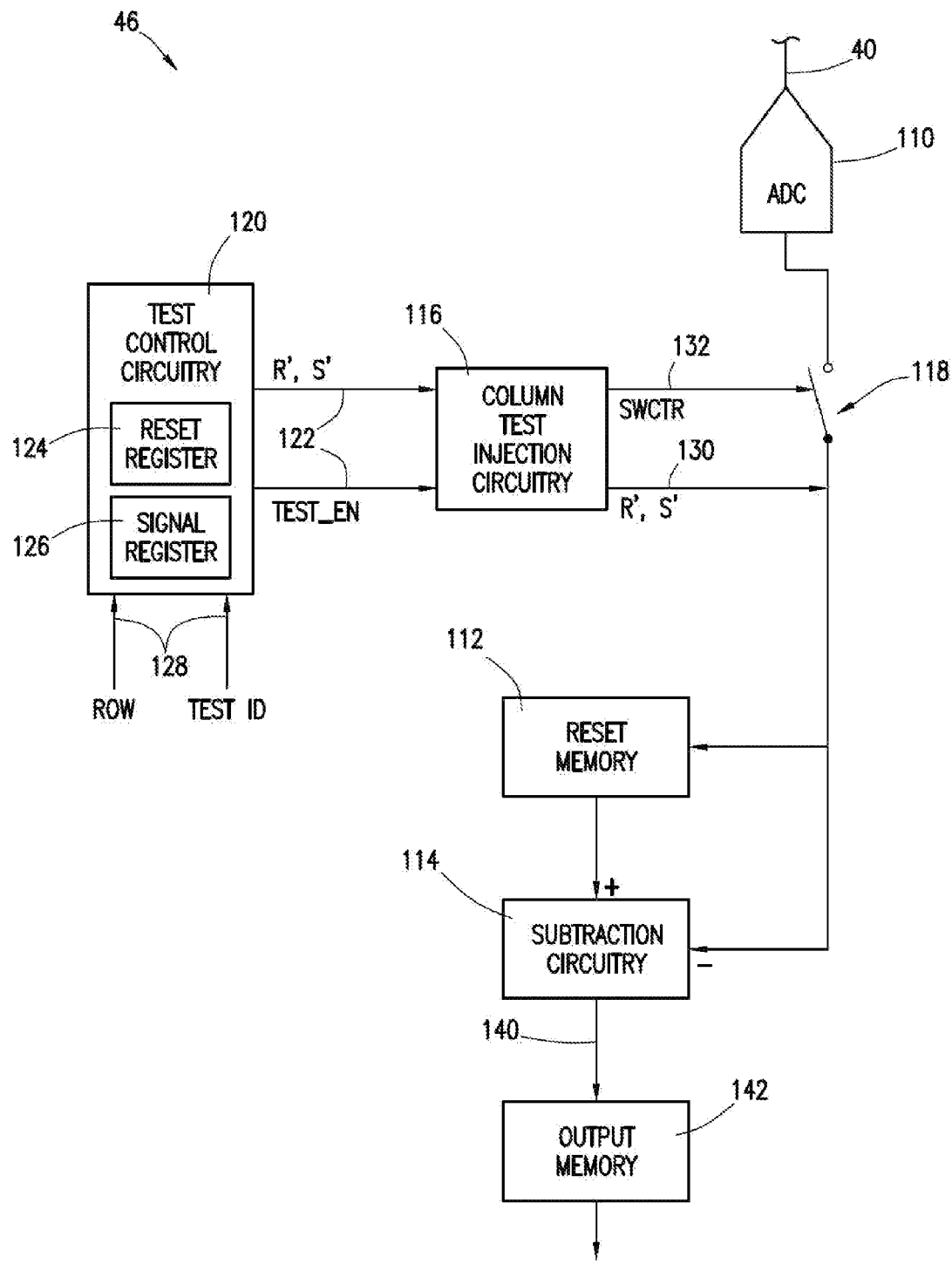
FIG. 3 is a diagram of an illustrative per-column column readout circuit having circuitry for performing test data injection in a frame of captured image data in accordance with an embodiment of the present invention.

If desired, column readout circuits 46 may inject test data into read out frames of image data during normal imaging operations (e.g., thereby eliminating the need to enter a separate test mode of operation). FIG. 3 is an illustrative diagram of a given column readout circuit 46 having test control circuitry for selectively injecting test data into read out pixel data frames for performing test and verification operations on image sensor 14 without the need to enter a separate test mode of operation.

As shown in FIG. 3, a given column circuit 46 of column and readout circuitry 42 may include ADC circuitry 110 that receives signals that have been read out from the pixels 28 in a corresponding column of array 30 via column line 40. Signals received at ADC 110 may include analog reset level signals and analog image level image signals, for example. The reset level and image level signals may be processed, for example, in a correlated double sampling (CDS) signal operation in order to remove kTC-reset noise from the final image signal.

ADC circuit 110 may receive analog reset level and image level signals over column line 40 and may convert the analog signals into corresponding digital signals (e.g., digital reset level signals and digital image level signals). Digital signals output by ADC 110 may sometimes be referred to herein as digital pixel values or digital pixel data (e.g., reset level digital pixel values, reset level digital pixel data, image level digital pixel values, or image level digital pixel data). The output of ADC 110 may be switchably coupled to column test injection circuitry 116, reset memory 112, and subtraction circuitry 114 via column switch 118.

When image level or reset level pixel data is provided at the output of ADC 110, switch 118 may be enabled (e.g., closed using switch control signal SWCTR) so that the pixel data is passed to reset memory 112 and subtraction circuitry 114. Reset memory 112 may receive and store reset level pixel data received from ADC 110 when switch 118 is closed. Reset memory 112 may store the received reset level pixel data until corresponding image level data has been received from ADC 110. Image level data may be passed to a first input (−) of subtraction circuitry 114. When image level data is received at the first input (−) of subtraction circuitry 114, reset memory 112 may output the corresponding stored reset level data to a second (+) input of subtraction circuitry 114. Subtraction circuitry 114 may subtract the image level data received from reset memory 112 from the corresponding reset level data to generate difference values on output 140. The difference values may be stored on output memory 142 and may be conveyed to control and processing circuitry 16 where the stored difference values are used to generate a final image. By generating and storing difference values between the reset and image level pixel data, kTC noise may be removed from the final image.

Column readout circuit 46 may include per-column test and verification circuitry such as column test data injection circuitry 116 that is controlled by test control circuitry 120 for performing test and verification operations. Column test injection circuitry 116 may have inputs that are coupled to test control circuitry 120 via paths 122. Column test injection circuitry 116 may receive test data (e.g., patterns of test bits) R' and S' and a test injection enable signal TEST_EN from test control circuitry 120 over paths 122. When test enable signal TEST_EN is asserted (or when signal TEST_EN otherwise indicates that test data injection should be performed), column test injection circuitry 116 may disable (open) switch 118 using switch control signal SWCTR provided to switch 118 over path 132 (e.g., provided to a control terminal of switch 118 over path 132). When switch 118 is open (turned off), column test data injection circuitry 116 may provide (e.g., "inject") test data R' and S' onto path 130.

Column test data injection circuitry 116 may provide test bits R' to reset memory 112 and may provide test bits S' to the (−) input of subtraction circuitry 114 (e.g., after providing test bits R' to reset memory 112). For example, circuitry 116 may provide bits S' to subtraction circuitry 114 after providing test bits R' to reset memory 112. Test bits R' may sometimes be referred to herein as reset level test bits whereas test bits S' may sometimes be referred to herein as image level test bits. Memory 112 may store test bits R' and may output test bits R' so that test bits R' are received at subtraction circuitry 114 when corresponding output test bits S' are received at subtraction circuitry 114. Subtraction circuitry 114 may subtract test bits S' from test bits R' to generate test difference values R'−S' at output 140. Test difference values R'−S' may be stored at output memory 142 and may be output to control and processing circuitry 16 as one or more rows of test (verification) data interspersed among rows of image data generated by array 30 (e.g., in a final image frame including test data and pixel data). For example, test control circuitry 120 may toggle switch 118 such that some rows of the final output image frame include pixel data received from array 30 whereas other rows of the final output image frame include test data injected by column test injection circuitry 116. The test difference values R'−S' may be processed by verification circuitry 110 to verify adequate performance by some or all of image sensor 14.

Test control circuitry 120 may coordinate and control test injection operations performed by column readout circuit 46. Test control circuitry 120 may include storage circuitry such as reset register 124 and signal register 126. Registers 124 and 126 may store test data R' and S' that are to be injected into the pixel data read out from array 30. For example, reset level test bits R' may be stored in reset register 124 whereas image level reset bits S' may be stored in image signal register 126. Stored test data R' and S' may be received from external circuitry such as control circuitry 16 (FIG. 2) or may be generated at test control circuitry 120 for performing any desired test and verification operations on image sensor 14. Stored test data R' and/or test data S' may include any desired pattern of bits sometimes referred to herein as a test pattern (e.g., a predetermined sequence of high and low bits for performing any desired testing on any desired portion of image sensor 14). Memory 112 and output memory 142 may be collectively referred to as column memory and may be formed from common memory circuitry or from separate memory circuits. If desired, registers 124 and 126 may generate global test signals (e.g., global bits R', S', and signals TEST_EN) for each column of array 30 or may be operated in modes where a first set (e.g., half) of the columns in array 30 receive a first set of test bits R' and S' whereas a second set (e.g., the remaining half) of the columns in array 30 receive a second set of different test bits R' and S'. Providing common test bits R' and S' for multiple columns of array 30 may reduce processing resources and power relative to scenarios where each column receives different test bits. Test control circuitry 120 and registers 124 and 126 may, for example, be located outside of column circuits 46 (e.g., as a part of circuitry 42 that is separate from column readout circuits or from other circuitry in image sensor 14), thereby allowing control circuitry 120 to provide test bits to multiple column circuits 46. Registers 124, 126, memory 112, and 142 may include any desired volatile and/or non-volatile storage circuitry (e.g., static or dynamic random access memory, flash memory, etc.). Column circuits 46 may be formed on a common semiconductor substrate (e.g., integrated circuit chip) as array 30 or may be formed on a separate substrate.

Test control circuitry 120 may receive row identification control signal ROW and test data identification signal TESTID over paths 128 (e.g., from other portions of column control and readout circuitry 42 and/or from control and processing circuitry 16). Row identification control signal ROW may identify the current row of the output image frame to be generated (e.g., a row of pixel data corresponding to a row of pixels 28 in array 30 or a row of test data to be appended or interposed between rows of pixel data generated by array 30). Test control circuitry 120 may generate a test enable signal TEST_EN based on row identification control signal ROW that instructs column test injection circuitry 116 to inject test data bits R' and/or S' onto signal path 130 or that instructs test injection circuitry 116 not to inject test data onto path 130. For example, test control circuitry 120 may identify that a row of test data should be inserted after the currently received row of pixel data or after the current row of the current image frame (as identified by row identification control signal ROW) and may subsequently instruct test injection circuitry 116 to disable switch 118 and to route test data R' and S' onto path 130. Test data identification signal TESTID may identify which bits of the test data stored on registers 124 and 126 is to be provided to column test injection circuitry 116 and routed to path 130. For example, identification signal TESTID may identify a particular test pattern or a subset of the stored bits to be injected onto path 130 for performing a desired test operation. Once test data injection is complete, column test injection circuitry may close switch 118 and pixel data received from array 20 may be routed to reset memory 112 and subtraction circuitry 114 for generating rows of pixel data in the current image frame.

By forming test injection circuitry 116 in each column readout circuit 46, test data may be selectively injected into each column of pixel data output by array 30. By storing test data on reset memory 112 and output memory 142, verification circuitry 100 may verify the performance of column memory in each column of readout circuitry 42 and each column of array 30 in addition to the performance of any other desired component of image sensor 14.

Figure 4:
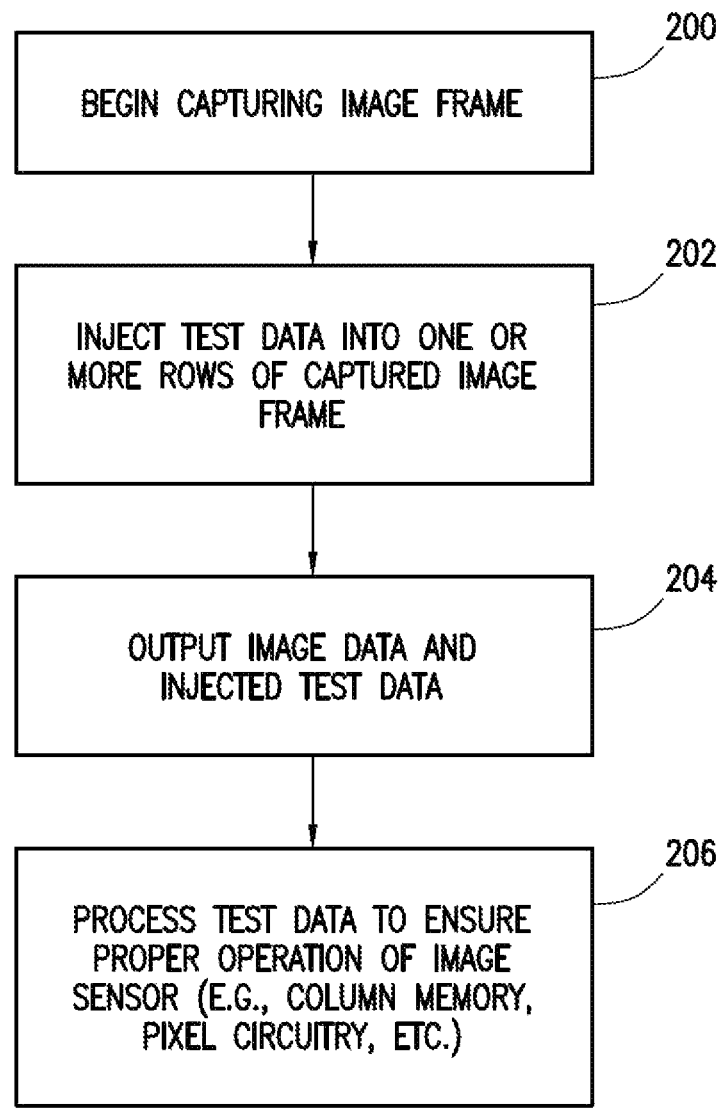
FIG. 4 is a flow chart of illustrative steps that may be performed by an image sensor for injecting test data in a captured image frame and for verifying proper functionality of the image sensor using the injected test data in accordance with an embodiment of the present invention.

FIG. 4 is a flow chart of illustrative steps that may be performed by camera module 12 to perform verification operations using image sensor 14 having column readout circuitry with per-column testing circuits 46 for injecting test data into image frames.

At step 200, pixel array 30 may begin capturing an image frame. For example, pixel array 30 may capture reset level and image level signals for a number of rows of pixels 28 on array 30.

At step 202, test control circuitry 120 in one or more column readout circuit 46 may inject test data into one or more rows of the image frame (e.g., between one or more rows of image data). The test data may include, for example, rows of difference values R'−S', whereas the rows of pixel data may include difference values generated by subtracting image level pixel values from reset level pixel values in circuits 46. The test data may be interposed between two or more rows of image data or may be appended to the beginning or the end of the image data.

At step 204, the image data and test data may be output to control and processing circuitry 16 (e.g., on a row-by-row basis, or as an entire image frame in scenarios where a frame buffer is used). The rows of image data (e.g., difference values) may be output to additional processing circuitry for additional image processing, displaying using display equipment, storage, etc. The rows of test data (e.g., values R'-S') may be provided to verification circuitry 100 (FIG. 2).

At step 206, verification circuitry 100 may process the test data to ensure proper operation of image sensor 14. For example, verification circuitry 100 may receive rows of test data as the rows are streamed from output memory 142 on a per-row basis and may process the test data to determine whether column memory in column circuits 46 is operating properly, whether circuitry within pixels 28 is operating properly, etc. If desired, the test data may be output to host 20 for performing verification operations external to camera module 12.

As an example, the test data may be compared to a predetermined reference data to identify faulty pixels (e.g., using verification circuitry 100 or host 20). Host 20 and/or verification circuitry 100 may be used to determine whether the faulty pixels (if any) would render image sensor 14 inoperable. The mere presence of faulty pixels does not necessarily mean that image sensor 14 has to be discarded. For example, if the faulty pixels are evenly distributed throughout the pixel array, image sensor 14 may still pass design criteria. If, however, the faulty pixels are concentrated in a small cluster, image sensor 14 may be considered unsatisfactory. In response to determining that the pixel array is still operable, imaging system 10 may resume the cycle of image capture and imaging system verification while system 100 continues to operate.

In response to host 20 and/or verification circuitry 100 determining that the pixel array is inoperable, host subsystem 20 may disable some or all of imaging system 10 and, if desired, generate a fault signal such as an audible or visible failure alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 5:
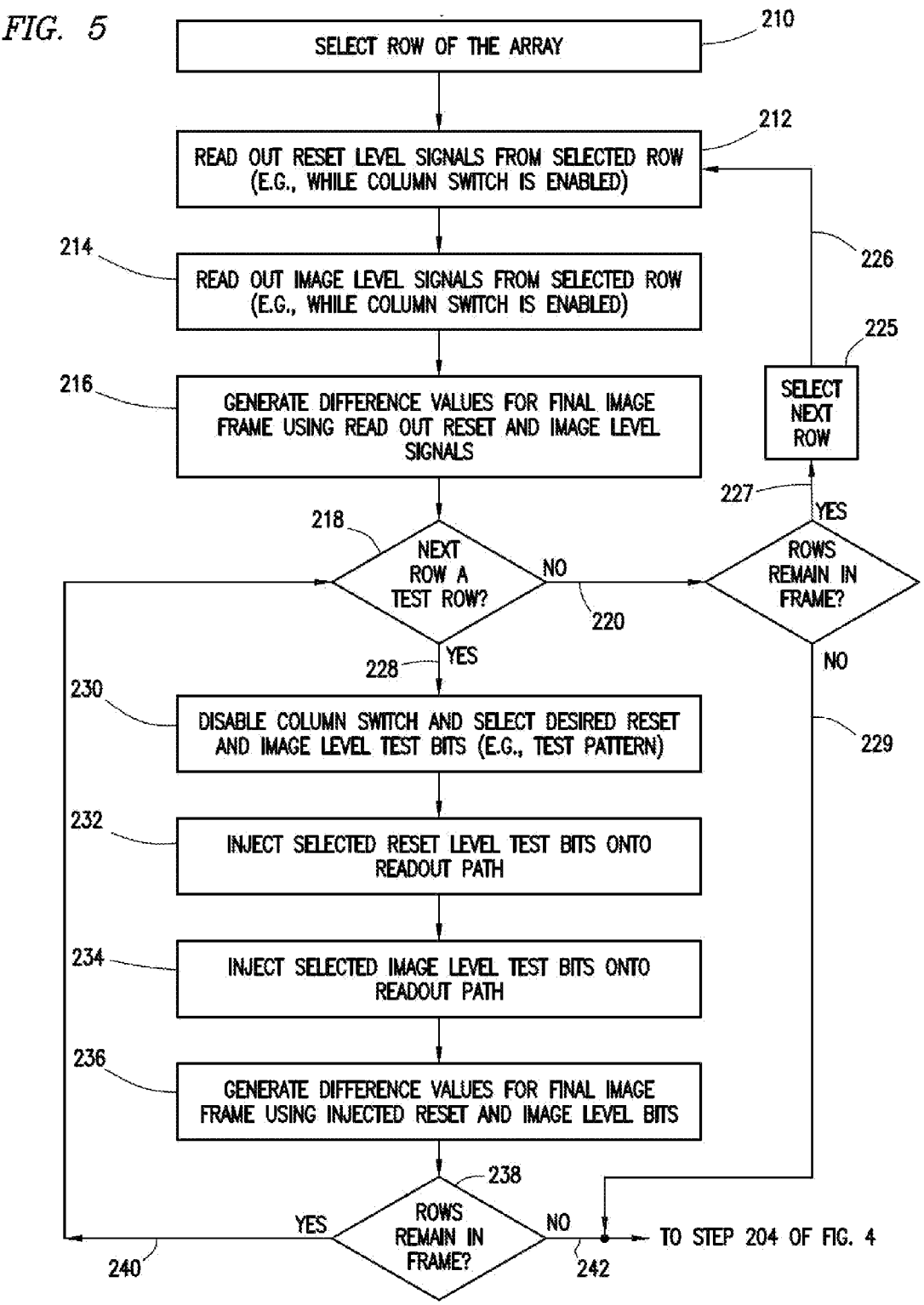
FIG. 5 is a flow chart of illustrative steps that may be performed by an image sensor having per-column test data injection circuitry for injecting test data into a captured image frame in accordance with an embodiment of the present invention.

FIG. 5 is a flow chart of illustrative steps that may be performed by image sensor 14 to inject test data into rows of read out pixel data of an image frame. The steps of FIG. 5 may, for example, be performed while processing step 202 of FIG. 4.

At step 210, control and processing circuitry 16 may select a given row of array 30. For example, a first row of array 30 may be selected. Processing circuitry 16 may provide row identification control signal ROW to test control circuitry 120 on column readout circuits 46 that identify the selected row of the array. Test control circuitry 120 may determine that the row identified by control signal ROW is not associated with test data and may thereby provide test enable signal TEST_EN to column test injection circuitry 116 that instructs test injection circuitry 116 to enable (close) column switch 118 so that ADC 110 is electrically coupled to reset memory 112 and subtraction circuitry 114.

At step 212, column readout circuits 46 may each read out reset level signals from the corresponding pixel of the selected row (e.g., a first column circuit 46 may read out a reset level signal from a first pixel of the selected row, a second column circuit 46 may read out a reset level signal from a second pixel of the selected row, etc.). The reset level signals may be converted to digital reset level values at ADC 110 and the digital reset level values may be stored on reset memory 112 in each column circuit 46.

At step 214, column readout circuits 46 may each read out image level signals from the corresponding pixel of the selected row (e.g., a first column circuit 46 may read out an image level signal from a first pixel of the selected row, a second column circuit 46 may read out an image level signal from a second pixel of the selected row, etc.). The image level signals may be converted to digital image level values at ADC 110 and the digital image level values may be passed to subtraction circuitry 114. Reset memory 112 may provide the stored reset level values to subtraction circuitry 114 as the image level values are received by subtraction circuitry 114.

At step 216, subtraction circuitry 114 may generate difference values by subtracting the image level values from the reset level values and may pass the difference values to output memory 142 over path 140. The difference values may be stored on output memory 142 and may be output to other processing circuitry on a row-by-row basis.

At step 218, test control circuitry 120 may determine whether the next row in the image frame (e.g., the row in the array or frame subsequent to the selected row) is a test row (e.g., a row for which test data is to be injected into the image frame). For example, if the first row of the array is selected at step 210, control circuitry 120 may determine whether the second row of the image frame should include injected test data or image data generated by array 30. If the next row of the image frame is not intended to be a test row, processing may proceed to step 224 as shown by path 220.

At step 224, control circuitry 120 may determine if rows remain in the frame for processing. If rows remain, processing may proceed to step 225 to select the next row of the array. Processing may loop back to step 212 as shown by 226 to read out pixel data for the next selected row of array 30. If no rows remain, processing may proceed to step 204 of FIG. 4 as shown by path 229. If the next row of the image frame is intended to be a test row, processing may proceed to step 230 as shown by path 228.

At step 230, test control circuit may instruct column test data injection circuitry 116 to disable (open) switch 132 (e.g., using control signal TEST_EN) to decouple ADC 110 from reset memory 112 and subtraction circuitry 114. Test control circuitry 120 may identify a set of reset level test bits R' stored on reset register 124 and a set of image level test bits S' stored on signal register 126 to inject as test data into the image frame. For example, control circuitry 120 may identify the set (pattern) of test bits to provide based on received test bit identification control signal TESTID. Test control circuitry 120 may provide the identified sets of reset level test bits R' and image level test bits S' to column test data injection circuitry 116.

At step 232, column test injection circuitry 116 may provide the set of reset level test bits R' to reset memory 112 via path 130. Reset test bits R' may be stored on reset memory 112. Reset memory 112 may provide the stored reset level values to subtraction circuitry 114 as image level test bits S' are received by subtraction circuitry 114.

At step 234, column test injection circuitry 116 may provide the set of image level test bits S' to subtraction circuitry 114 via path 130.

At step 236, subtraction circuitry 114 may generate difference test values by subtracting the image level test bits from the reset level test bits and may pass the difference test values to output memory 142 over path 140. The difference test values may be stored on output memory 142 and may be output to processing circuitry on a row-by-row basis.

At step 238, test control circuitry 120 may determine whether additional rows remain in the frame to be generated. If additional rows remain, processing may loop back to step 218 as shown by path 240 so that test data is generated for the next row in the frame or image data is read out for the next row of the frame. If no additional rows remain, processing may proceed to step 204 of FIG. 4 as shown by path 242. In this way, a final image frame having rows of test data (e.g., test difference values R'-S') interspersed with rows of image data may be output to processing circuitry 16 on a row-by-row basis. Verification circuitry 100 may process the injected test data to verify proper performance of image sensor 14. By generating separate reset level and image level test bits, test control circuitry 120 may determine whether column memory in column circuit 46 (e.g., reset memory 112, output memory 142, etc.) is functioning properly. The steps of FIG. 4 may be performed for each column circuit 46 across each row of the frame. The steps of FIG. 4 may be repeated, if desired, to generate additional image frames (e.g., still image frames, a sequence of image frames used in generating video data, etc.).

Figure 6:
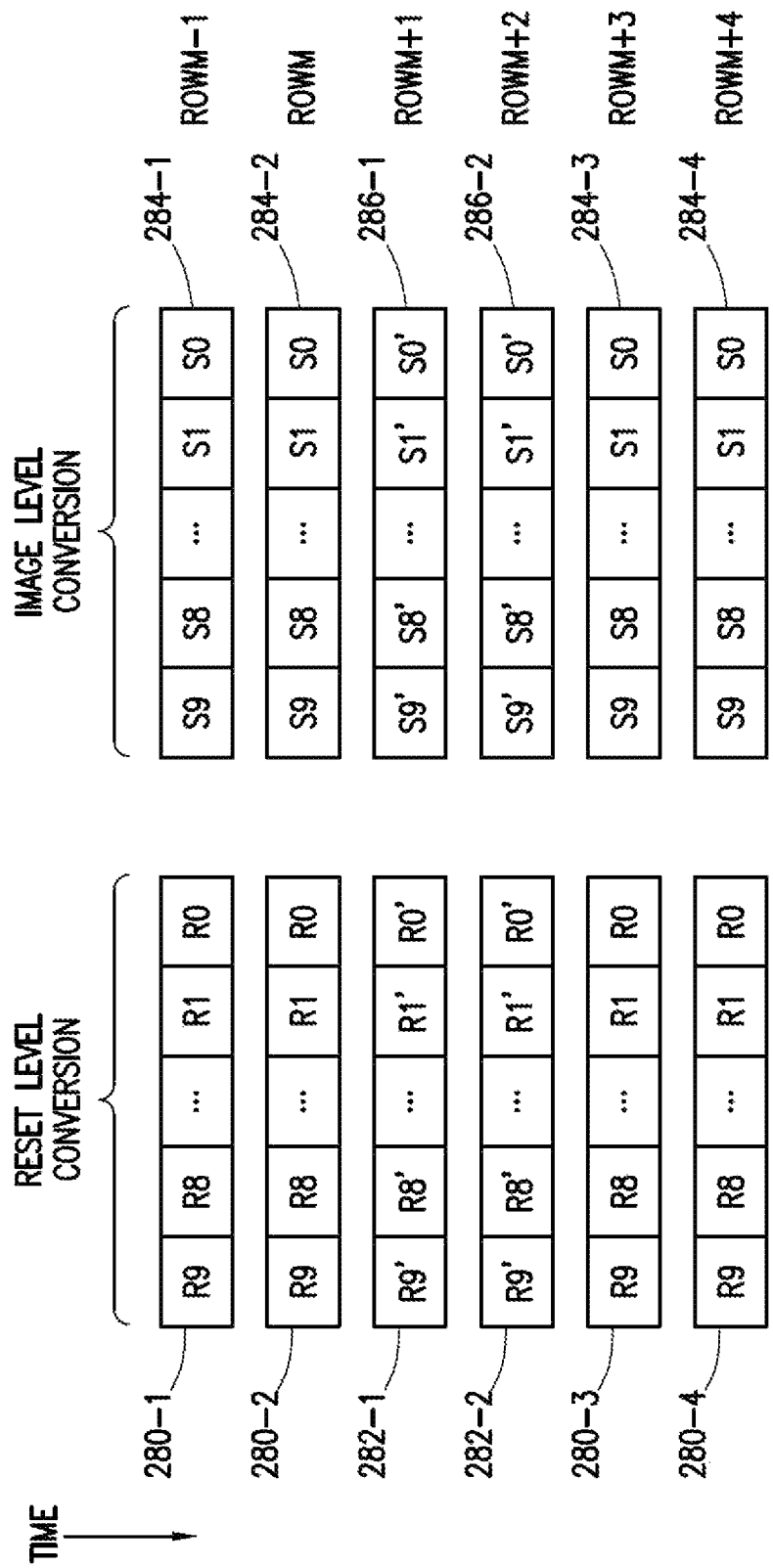
FIG. 6 is an illustrative diagram showing how a per-column readout circuit may generate test data that is interspersed among rows of read out pixel data in an image frame in accordance with an embodiment of the present invention.

FIG. 6 is an illustrative diagram showing how rows of test bits may be interspersed with rows of image data for generating a final image frame using a given one of column readout circuits 46. As shown in FIG. 6, a given readout circuit 46 may receive a first reset level value 280-1 and a first image level value 284-1 from a pixel in a corresponding column and the $(M-1)^{th}$ row of the frame (e.g., while processing steps 212 and 214 of FIG. 5). Readout circuit 46 may subsequently receive a second reset level value 280-2 and a second image level value 284-2 from a second pixel in the corresponding column and the $M^{th}$ row of the frame (e.g., values 280-1 and 280-2 may be generated by pixels in adjacent rows of the same column of array 30). In the example of FIG. 6, each reset level value and image level value is a ten bit value (e.g., reset value 280-1 includes ten bits R0, R1, . . . R8, and R9, first image level value includes ten bits S0, S1, . . . S8, and S9, etc.). This example is merely illustrative and, in general, the reset and image level values may include any desired number of bits.

In the example of FIG. 6, circuitry 120 may identify that a row of test data is to be generated for the $(M+1)^{th}$ row and the $(M+2)^{th}$ row of the frame (e.g., while processing step 218 of FIG. 5). Test data injection circuitry 116 may inject reset level test value 282-1 and image level test value 286-1 onto readout path 130 (e.g., while processing steps 232 and 234 of FIG. 5) and may subsequently inject reset level test value 282-2 and image level test value 286-2 onto readout path 130. In the example of FIG. 6, each reset level test value and image level test value is a ten bit value (e.g., reset level test value 282-1 includes ten bits R0', R1', . . . R8', and R9', image level test value includes ten bits S0', S1', . . . S8', and S9', etc.). This example is merely illustrative and, in general, the reset and image level test values may include any desired number of bits. Readout circuit 46 may subsequently receive reset and image level data from array 30 for rows M+3 and M+4 of the image frame. Values 280-3 and 280-4 may, for example, be generated by pixels in adjacent rows that are in the same column and adjacent to the pixels of array 30 that generated values 280-1 and 280-2 (e.g., test data 282 and 286 may be interposed between pixel data generated by adjacent rows of array 30) or may be generated by pixels in adjacent rows that are in the same column but are non-adjacent to the pixels that generated values 280-1 and 280-2 (e.g., test data 282 and 286 may replace pixel data generated by one or more rows of array 30 in the final frame).

Each image level value 284 may be subtracted from the corresponding reset level value 280 to generate a difference value used in the final image frame. For example, first image level value 284-1 may be subtracted from first reset level value 280-1 to generate a first difference value corresponding to the first pixel in the corresponding column and the $(M-1)^{th}$ row of the array, second image level value 284-2 may be subtracted from second reset level value 280-2 to generate a second difference value corresponding to the second pixel in the corresponding column and the $M^{th}$ row of the array, etc. Similarly, first signal level test value 286-1 may be subtracted from first reset level test value 282-1 to generate a first test difference value for the corresponding column and the $(M+1)^{th}$ row of the image frame, second signal level test value 286-2 may be subtracted from the second reset level test value 232-2 to generate a second test difference value for the corresponding column and the $(M+2)^{th}$ row of the image frame, etc. In this way, a kTC reset noise-mitigated final image frame may be generated during uninterrupted, normal imaging operations without entering a dedicated test/calibration mode, while allowing for verification of column memory and/or any other desired portion of image sensor 14.

Figure 7:
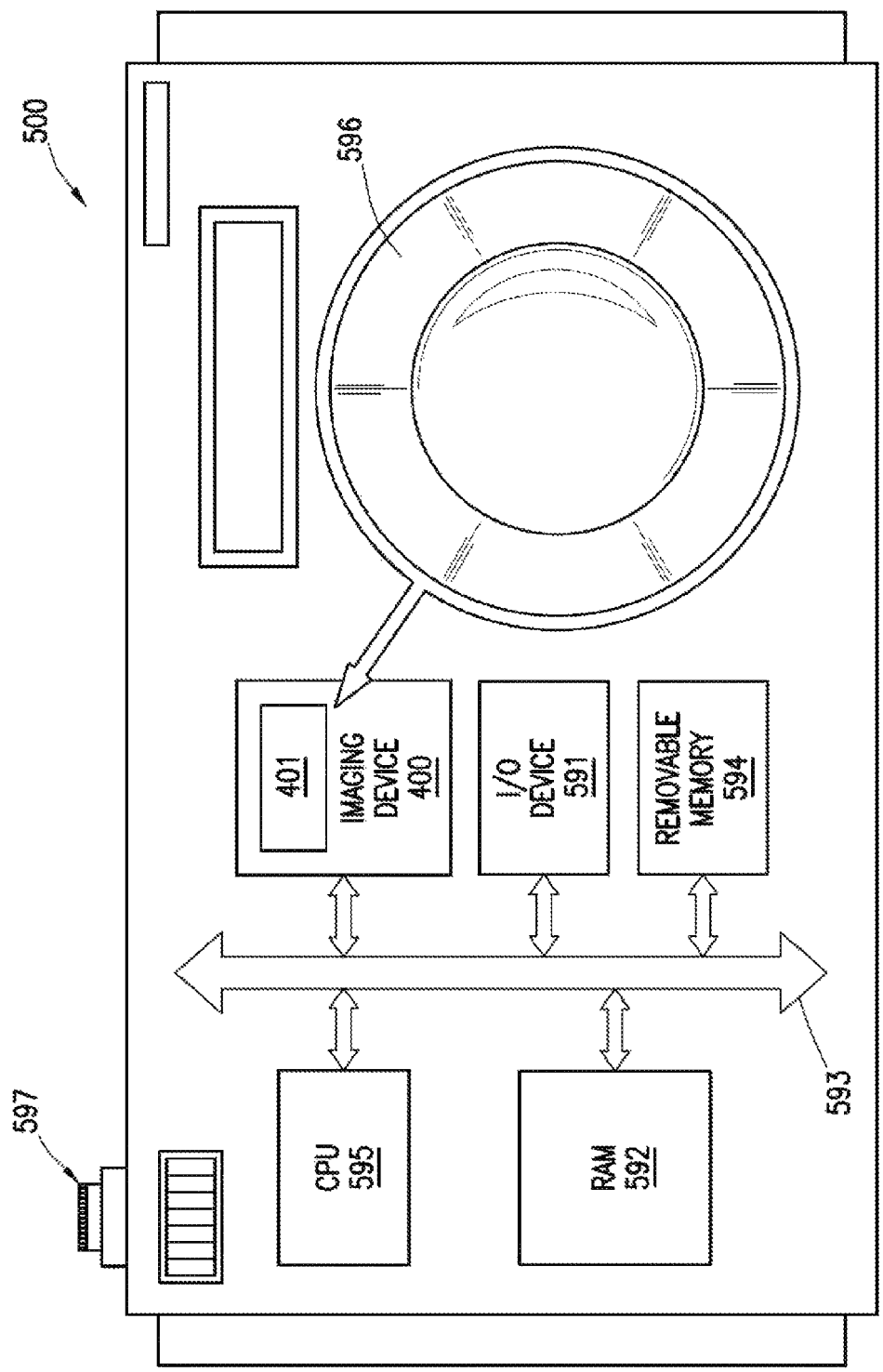
FIG. 7 is a block diagram of a system employing the embodiments of FIGS. 1-6 in accordance with an embodiment of the present invention.

FIG. 7 shows in simplified form a typical processor system 500, such as a digital camera, which includes an imaging device 400. Imaging device 400 may include a pixel array 401 having pixels of the type shown in FIG. 2 (e.g., pixel array 401 may be an array of pixels 28) formed on an image sensor SOC. Test data may be injected into the image frame during normal imaging operations using per-column readout circuits using the methods described above. Verification circuitry may compare test data that has been read out from the pixel array with reference data to determine whether the image pixel array is functioning properly.

Processor system 500 is exemplary of a system having digital circuits that may include imaging device 400. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array such as pixel array 401 when shutter release button 597 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 400 may also communicate with CPU 595 over bus 593. System 500 may include random access memory (RAM) 592 and removable memory 594. Removable memory 594 may include flash memory that communicates with CPU 595 over bus 593. Imaging device 400 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

Column readout circuitry coupled to the array may include column readout circuits each coupled to a corresponding column via a respective column readout line. Each column readout circuit may include converter circuitry coupled to image pixels in a corresponding column of the array, column memory, switching circuitry coupled between the column memory and the converter circuitry, and test data injection circuitry. The test data injection circuitry may be configured to disable the switching circuitry and to provide test data to the column memory while the switching circuitry is disabled and may be configured to enable the switching circuitry so that pixel data received by the converter circuitry is conveyed to the column memory.

The column memory may include reset memory and output memory. Subtraction circuitry may be interposed between the reset memory and the output memory. The test data injection circuitry may store and retrieve first and second sets of test data bits, and may pass the first set of test bits to the reset memory and the second set of test bits to the subtraction circuitry (e.g., the injection circuitry may inject test data onto the column memory) while the switching circuit is disabled. The reset memory may pass the first set of test bits to the subtraction circuitry while the subtraction circuitry receives the second set of test bits from the injection circuitry. The subtraction circuitry may generate a test difference value by performing a subtraction operation using the first and second sets of test bits. The output memory may store the test difference value.

The test data injection circuitry may enable the switching circuitry to electrically couple the output of the converter circuitry to the column memory. While the switching circuitry is enabled, the converter circuitry may pass reset level pixel values (pixel data) to the reset memory and may pass image level pixel values to the subtraction circuitry. The reset memory may provide the reset level pixel values to the subtraction circuitry while the subtraction circuitry receives the image level pixel values. The subtraction circuitry may perform subtraction operations using the reset and image level pixel values to generate difference values that are stored on the output memory. The difference values and test difference values may form portions of a column of an image frame such that the test difference values are interspersed with the difference values. Collectively, each of the column readout circuits may store an image frame having rows of test data bits interspersed with rows of pixel data (e.g., a given row of test data in the image frame may be interposed between two or more rows of pixel data).

Verification circuitry may be coupled to the column readout circuitry and may receive some or all of the image frame stored on the output memory. The verification circuitry may process the test data (e.g., test difference values) in the image frame to verify proper functionality of at least some of the imaging system based on the test data. If the imaging system is not functioning optimally, portions of the imaging system may be disabled, a user of the imaging system may be notified, etc. The image frame may be passed to other processing circuitry and output as a final image frame (e.g., that includes the test data or from which the test data has been removed). In this way, verification operations may be performed using image frames captured during a normal imaging mode of operation without disrupting imaging operations and without the need to enter a dedicated testing or calibration mode of operation of the imaging system.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system comprising:
   an array of image pixels arranged in rows and columns;
   converter circuitry coupled to image pixels in a given column of the array via a corresponding column line;
   column memory;
   switching circuitry coupled between the column memory and the converter circuitry;
   test data injection circuitry, wherein the test data injection circuitry is configured to disable the switching circuitry and to provide test data to the column memory while the switching circuitry is disabled; and
   subtraction circuitry, wherein the test data injection circuitry is configured to provide the test data to the column memory and the subtraction circuitry while the switching circuitry is disabled, and wherein the subtraction circuitry is configured to receive reset level pixel data while the switching circuitry is enabled.

2. The imaging system defined in claim 1, wherein the test data injection circuitry is configured to electrically decouple the converter circuitry from the column memory by disabling the switching circuitry.

3. The imaging system defined in claim 1, wherein the test data comprises first and second sets of test data, wherein the column memory comprises reset memory, and wherein the test data injection circuitry is configured to provide the first set of test data to the reset memory and the second set of test data to the subtraction circuitry while the switching circuitry is disabled.

4. The imaging system defined in claim 3, wherein the reset memory is configured to provide the first set of test data to the subtraction circuitry while the test data injection circuitry provides the second set of test data to the subtraction circuitry, and wherein the subtraction circuitry is configured to generate a difference value by subtracting the second set of test data from the first set of test data.

5. The imaging system defined in claim 4, wherein the column memory further comprises output memory that is configured to store the difference value.

6. The imaging system defined in claim 3, further comprising:
   test control circuitry, wherein the test control circuitry is configured to instruct the test data injection circuitry to disable the switching circuitry based on a current row of an image frame being generated by the array of image pixels.

7. The imaging system defined in claim 6, wherein the test control circuitry comprises a first register that stores the first set of test data and a second register that stores the second set of test data.

8. The imaging system defined in claim 1, wherein the test data injection circuitry is configured to enable the switching circuitry and the converter circuitry is configured to provide pixel values generated by the image pixels of the given column to the column memory while the switching circuitry is enabled.

9. The imaging system defined in claim 8, wherein the column memory comprises output memory that stores a column of data for an image frame, and wherein the test data injection circuitry is configured to selectively toggle the switching circuitry so that the column of data for the image frame stored on the column memory includes the test data interspersed with pixel values generated by the image pixels in the given column of the array, the imaging system further comprising:

verification circuitry, wherein the verification circuitry is configured to verify proper functionality of at least some of the imaging system based on the test data in the image frame.

10. The imaging system defined in claim 8, wherein the converter circuitry comprises analog-to-digital converter circuitry, the test data comprises a predetermined pattern of test data bits, and the column memory is configured to store the predetermined pattern of test data bits and the pixel values generated by the image pixels of the given column during respective time periods while generating a single image frame.

11. A method of operating an image sensor to generate an image frame, wherein the image sensor comprises an array of image pixels arranged in rows and columns and a column readout circuit coupled to a given column of the array, wherein the column readout circuit comprises column memory coupled to the given column of the array via a column switch, the method comprising:

with test data injection circuitry in the column readout circuit, enabling the column switch;

with the column memory, storing pixel values generated by image pixels in the given column of the array while the column switch is enabled;

with the test data injection circuitry, disabling the column switch;

with the test data injection circuitry, injecting test data bits onto the column memory while the column switch is disabled, wherein the test data bits are interspersed between the pixel values in a given image frame; and with reset memory in the column memory, storing reset level pixel values generated by the image pixels in the given column while the column switch is enabled.

12. The method defined in claim 11, further comprising:

with the reset memory, providing the stored reset level pixel values to subtraction circuitry while the subtraction circuitry receives corresponding image level pixel values from the image pixels in the given column.

13. The method defined in claim 12, further comprising:

with the subtraction circuitry, performing subtraction operations using the image level pixel values and the reset level pixel values to generate difference values; and with output memory in the column memory, storing the generated difference values.

14. The method defined in claim 13, wherein the test data bits comprise first and second sets of data bits, the method further comprising:

with the reset memory, storing the first set of test data bits while the column switch is disabled;

with the subtraction circuitry, receiving the second set of test data bits from the test data injection circuitry while the column switch is disabled; and with the reset memory, providing the stored first set of test data bits to the subtraction circuitry while the subtraction circuitry receives the second set of test data bits from the test data injection circuitry.

15. The method defined in claim 14, further comprising:

with the subtraction circuitry, performing subtraction operations using the first and second sets of test data bits to generate test difference values; and with the output memory, storing the generated test difference values.

16. The method defined in claim 15, further comprising:

with the output memory, outputting rows of a column of the image frame, wherein the image frame includes the generated test difference values interspersed among the generated difference values.

17. The method defined in claim 16, further comprising:

with verification circuitry coupled to the column readout circuit, processing the generated test difference values to verify proper functionality of at least part of the image sensor.

18. A system, comprising:

a central processing unit;

memory;

input-output circuitry; and an imaging device, wherein the imaging device comprises:

an array of image pixels arranged in rows and columns; and column readout circuitry coupled to the array via a plurality of column readout lines, wherein the column readout circuitry comprises:

reset memory;

subtraction circuitry;

test data injection circuitry, wherein the test data injection circuitry is configured to provide a first set of test bits to the reset memory and a second set of test bits to the subtraction circuitry, wherein the reset memory is configured to provide the first set of test bits to the subtraction circuitry while the subtraction circuitry receives the second set of test bits, and wherein the subtraction circuitry is configured to generate test data by performing a subtraction operation using the first and second sets of test bits; and output memory, wherein the output memory is configured to store rows of an image frame having rows and columns, wherein at least one row of the image frame is formed from the test data and at least one row of the image frame is formed from pixel data generated by the image pixels.

19. The system defined in claim 18, wherein the at least one row of the image frame formed from the test data is interposed between at least two rows of the image frame that are formed from the pixel data generated by the image pixels, wherein the subtraction circuitry is configured to generate the pixel data in the at least two rows of the image frame by performing a subtraction operation using reset level pixel values and image level pixel values generated by the image pixels, and wherein the system further comprises:

verification circuitry configured to verify satisfactory performance of at least part of the imaging device using the at least one row of the image frame formed from the test data.

* * * * *